Jan. 4, 1949.  I. L. WOLK  2,458,456
EMULSION POLYMERIZATION
Filed Dec. 23, 1944
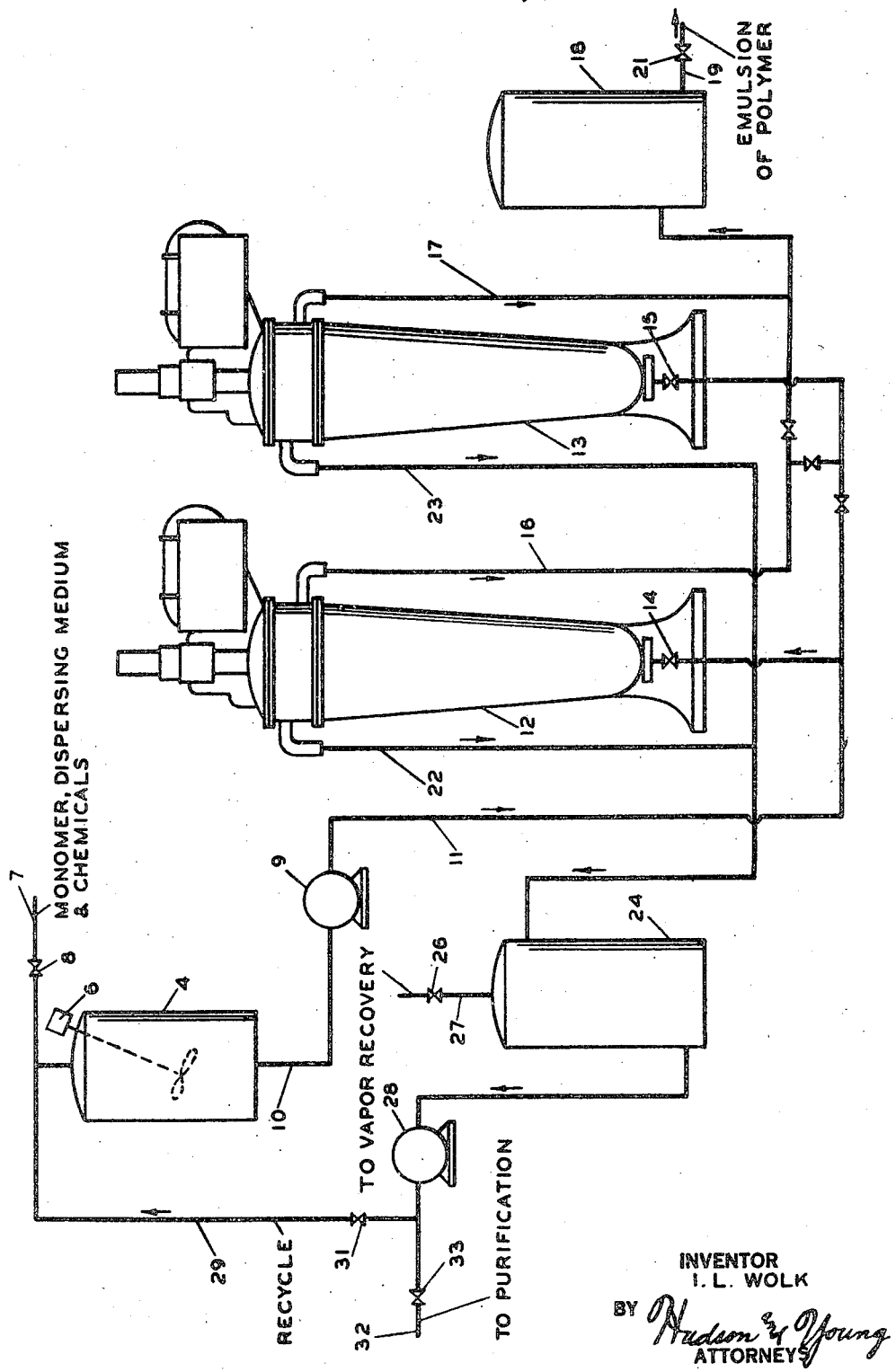
INVENTOR
I. L. WOLK
BY Hudson & Young
ATTORNEYS Patented Jan. 4, 1949

2,458,456

UNITED STATES PATENT OFFICE 2,458,456

EMULSION POLYMERIZATION

I. Louis Wolk, Bartlesville, Okla., assignor to Phillips Petroleum Company, a corporation of Delaware Application December 23, 1944, Serial No. 569,595

2 Claims. (Cl. 260—86.5)

This invention relates to a process for the production of polymers and copolymers by emulsion polymerization. It is particularly applicable to the production of synthetic rubbers by the emulsion polymerization method.

Synthetic rubbers include polymers of hydrocarbons, substituted hydrocarbons, amides, esters, and copolymers of one or more of these materials. Particularly important are the butadiene polymers; modified butadiene polymers (or copolymers), e. g. GR–S; and substituted butadiene polymers, e. g. neoprene.

Emulsion polymerization is assuming an important place in the production of synthetic rubber. "Polymerization" as used in this sense is generic to both simple polymerization and copolymerization and "polymer" in the generic sense designates the polymerization product. Outstanding in importance at the present time are the emulsion polymerization processes used for the production of tire-type and oil-resistant synthetic rubbers. The bulk of these synthetic rubbers are formed by polymerization of a conjugated diolefin of the butadiene type, such as butadiene-1,3, isoprene, and other homologs of butadiene-1,3, which polymerize in a similar manner, with a compound containing an active vinyl group or a $CH_2=C<$ group, such as styrene, acrylonitrile, methyl methacrylate, methyl acrylate, vinylidene chloride, etc. The use of emulsion polymerization may be expected to be extended to the manufacture of other elastomers and plastomers as the synthetic rubber and synthetic resin industries develop.

In the manufacture of GR–S, an aqueous emulsion of the monomers, butadiene and styrene, is made up in pressure vessels called polymerizers. In making the emulsion it is customary to use an emulsifying agent, such as soap; a buffer for control of pH; and an emulsion stabilizer. A polymerization catalyst is added to the emulsion, together with a modifier to control the properties of the polymer. The polymerizers are autoclaves provided with means for continuously stirring the emulsion. After a period of a number of hours in the autoclave, but usually before polymerization is quite complete, the emulsion is discharged and polymerization arrested by phenyl-beta-naphthylamine or other suitable polymerization inhibitor. The synthetic rubber latex so produced is degassed, i. e. unreacted monomers removed therefrom, creamed with brine and treated with acid to coagulate the polymer. The curd formed by the coagulation step is washed, dried, and baled, after which it may be processed in any of several ways to produce finished products. A disadvantage of this process is the fact that the polymerization is carried out batchwise in the polymerizers. After the polymerization, the remaining operations can be, and usually are, carried on in a continuous manner. The present invention provides a continuous process for the manufacture of synthetic rubber, for example GR–S, by emulsion polymerization. Many advantages of such a process will be apparent to those skilled in the art.

An object of this invention is to provide an improved process for carrying out emulsion polymerization reactions.

Another object of this invention is to provide an improved process for the manufacture of synthetic rubber by the emulsion polymerization method.

Still another object is to provide such a process in which the polymerization is effected in a continuous manner.

A further object of this invention is to provide a process for emulsion polymerization in which the reaction product can be controlled.

These and other objects and advantages will be apparent from the following detailed description of the process as illustrated in the accompanying drawings.

The drawing is a diagrammatic flow sheet illustrating one modification of my invention.

In accordance with my invention, the polymer is separated from the unreacted monomers as it is formed. The unreacted monomers are recycled to the system and may be used for the making up of more emulsion. It is apparent that this results in a continuous process in which accurate control of the polymer is attained. This separation of the polymer concentrate is effected by carrying out the polymerization in centrifuges.

Another advantage of the present invention is that the polymer may be removed from the polymerization zone when it has attained a given size or molecular weight. This results in a uniform product which may be carefully controlled. Still another advantage is that with the present process the throughput of materials per volume of reaction zone is much higher than in the conventional batchwise polymerization. The polymerization, when carried out batchwise, proceeds at an almost constant rate until about 50 to 60 per cent of the monomers have entered into the reaction, then at a progressively lower rate to completion. After the 60 per cent point has been reached, for each increment polymerized, the time required for polymerization increases. In batch emulsion polymerization methods, it is customary to stop the polymerization when about 80 per cent complete. Polymerization of butadiene and styrene to make GR-S reaches 80 per cent completion in about one third the time required to obtain 95 per cent completion of the reaction. Similarly, the time required to obtain 50 per cent completion of the reaction is about one third the time required to reach 80 per cent completion. Therefore it can be seen that in the process of my invention, in which polymer is removed continuously and fresh monomer continuously added, the volume of the reaction zone required to produce a given quantity of product is much less than for conventional processes.

For convenience in describing the process of my invention it will be described as applied to the production of a polymer formed by copolymerization of butadiene and styrene in an aqueous emulsion. This is illustrative only and is not to be construed as in any way limiting the scope of the invention.

With reference to the drawing, the emulsion is made up in a vessel 4 provided with a stirrer 6. The raw materials, comprising butadiene and styrene, together with water, emulsifying agents, and other chemicals, are supplied to the vessel through line 7 as controlled by valve 8. In the vessel 4, an aqueous emulsion of the butadiene and styrene is prepared. The emulsion is transferred by the pump 9 via lines 10 and 11 to centrifugal polymerizers 12 and 13. The flow of emulsion to each of the polymerizers may be controlled by valves 14 and 15. The polymerizers are centrifuges of conventional design capable of operating under pressure.

In the polymerizers, the latex is subject to conditions favorable to polymerization and, simultaneously, to the action of centrifugal force. Temperatures within the range of 60 to 100° C. are satisfactory for the copolymerization of butadiene and styrene to produce rubber-like polymers. The copolymer molecules have a density greater than the density of the monomers. As the polymer is formed, it is concentrated in the form of an emulsion relatively free from the lighter monomeric materials. The concentrated emulsion of the polymer is withdrawn from the polymerizers and passes through lines 16 and 17 to a receiver 18. The receiver is set at a level somewhat below that of the polymerizers to allow free flow of emulsion from the polymerizers to the receiver. From the receiver, the polymer in the form of concentrated emulsion is withdrawn through line 19 as controlled by valve 21. The concentrated emulsion of the polymer from receiver 18 may be coagulated in conventional manner and the resulting curd processed as desired. Degassing of the emulsion as conventionally practiced is unnecessary since by the method of my invention, removal of unreacted monomer is accomplished by the action of centrifugal force in the polymerizer.

Unreacted monomers and dispersing medium are withdrawn from the polymerizers through lines 22 and 23 and passed to an accumulator 24. The pressure in accumulator 24 is controlled by valve 26 in line 27 through which vapors may be removed as necessary. This, in turn, controls the pressure in the polymerizers. The pressure maintained in the polymerizers is dependent upon the temperature at which the polymerization is carried out. The control of pressure in the polymerizers and withdrawal of unreacted monomers, partly in vapor phase, from the polymerizers via lines 22 and 23 allows control of temperature in the polymerizers. These vapors are taken from the accumulator 24 through line 27 and may be condensed and returned to the system as is well known in the art. The steps of vaporization of volatile components, followed by condensation and return of the condensate to the system are known in the art as "refluxing" and are commonly used for temperature control. From the accumulator, the unreacted monomers and dispersing medium are recycled to the vessel 4 through line 29 as controlled by valve 31. A part or all of the stream from pump 28 may be removed continuously or intermittently through line 32 as controlled by valve 33 for treatment prior to recycling. This treatment may consist of purification of the monomeric materials in conventional manner. Preferably, only a fraction of the stream is withdrawn through line 32 and processed for the removal of dimers and other undesirable by-products of the polymerization.

The polymerization begins in vessel 4 and is continued in the polymerizers 12 and 13 until the separation between the polymer and the unreacted monomer is effected. The polymerizer is operated at a speed sufficient to cause separation when the polymerization has proceeded to the desired extent. For example, the separation may be made at 20 per cent completion with the result that a rubber product is obtained which has properties superior in many respects to conventional GR-S.

While I have shown the centrifuges in parallel, it is within the scope of my invention to use a series of centrifuges for the polymerization. Where a series of centrifuges is used, the relative concentration of comonomers in each may be maintained irrespective of the degree of polymerization of the particles which are removed in the preceding centrifuge. This permits complete polymerization and insures removal, in the final step, of completely polymerized material. An aging period by continuously circulating the polymer formed, in the absence of comonomers, may be provided prior to coagulation. Maintenance of comonomer concentration in the series of centrifuges permits the polymerization of partially formed particles to continue in each polymerizer under optimum conditions.

For example, a butadiene-acrylic nitrile emulsion is introduced into the first of a series of centrifugal polymerizers, which rotates at a rate sufficient to separate a concentrated latex containing partially and completely formed rubber particles, this latex is then passed into a second centrifuge which if desired, is operated at a speed which will effect a separation of a higher proportion of the heavier particles. These particles are then passed into another centrifuge and so on. Into any of these centrifuges, or all of them, may be introduced fresh comonomer emulsion. There may be, also, circulation of unreacted emulsion from one centrifuge to another, or this circulation may be in series either co-current or counter-current. There may also be re-circulation of unreacted emulsion in each centrifuge. The introduction of fresh emulsion and recirculation may be so controlled as to give a fairly constant unreacted emulsion composition in each polymerizer. This will also permit control of the type of polymer and degree of polymerization which may be effected in each polymerizer.

At the beginning of the polymerization the comonomers, such as butadiene and acrylic nitrile, exist in an emulsion or dispersed form in an aqueous phase in the presence of an emulsifying agent. During the reaction, the comonomers polymerize with the formation of larger and heavier copolymer molecules which also remain in dispersed condition, resulting ultimately in the formation of rubber particles which exist in emulsion as a synthetic latex. In the present process the polymerization is carried out in a centrifugal polymerizer constructed like a centrifuge, instead of in a stationary vat. This centrifugal polymerizer is operated at a speed which is sufficient to continuously separate a concentrated emulsion containing particles of desired mass or varying degrees of polymerization. The separation may be rough, in which case a series of polymerizers may be used. In other words, the particles separated would largely be those which had reached a desired molecular weight or degree of polymerization, and such separation would be effected instantaneously and continuously.

By the process of my invention, advantage may be taken of the "seeding" effect of the synthetic rubber particles which are present at all times in the polymerization zones. This seeding effect has been found to effect a material increase in the rate of reaction. The continuous removal of the polymer as it is formed eliminates the tendency for undesirable materials to build up on the walls of the polymerizer.

*Example*

A synthetic rubber recipe containing the following ingredients and proportions is admixed in emulsion form in an apparatus such as described in the drawing:

| | Parts |
|---|---|
| Butadiene | 75 |
| Styrene | 25 |
| Sodium stearate | 5 |
| Potassium persulfate catalyst | 0.30 |
| Potassium ferricyanide activator | 0.15 |
| Dodecyl mercaptan modifier | 0.50 |
| Water | 180 |

The resulting emulsion is introduced into a centrifuge, for example of the Sharples tubular type. Initially the centrifuge is operated at a low velocity, sufficient merely to keep the emulsion agitated. Polymerization is carried out at a temperature of about 50° C., the centrifuge being surrounded by heating coils to maintain temperature. Pressures sufficient to maintain liquid phase are provided. Due to the continuous introduction of cold emulsion, temperatures are readily kept from rising in the polymizer. After a period of eight hours the emulsion is about 50% polymerized and at that point the velocity of the centrifuge is increased to the point at which a polymer-rich fraction is being continuously removed. This velocity may, for example, be between 3000 and 6000 r. p. m. At the same time a lighter, monomer-rich fraction comprising unpolymerized emulsion and some coalesced monomer is continuously withdrawn as the light fraction and returned to the mixing vat. Fresh emulsion is then supplied continuously to the centrifugal polymerizer to replace the materials withdrawn. The polymer-rich fraction is then coagulated by the addition of acetic or sulfuric acid until the rubber crumbs separate from the emulsion. The crumbs are separated by filtration or decantation, washed, dried, and compacted into bales. The usual monomer stripping and creaming steps are eliminated since the latex is recovered from the polymerizer in a stripped and concentrated form. Where it is desired to centrifugally recover a leaner polymer-containing fraction, stripping and creaming may be necessary. The coagulation is carried out continuously or batchwise.

I claim:

1. A process for the continuous emulsion polymerization of a conjugated diolefin and a monomer copolymerizable therewith containing an active $CH_2=C<$ group, which comprises forming an aqueous emulsion of said diolefin and said monomer; continuously introducing said emulsion into a centrifuging zone under polymerizing conditions and continuously subjecting said emulsion in said zone to the action of a centrifugal force sufficient to continuously separate polymer, as formed, in a polymer-rich fraction at one point in said zone, and unpolymerized material at another point in said zone; continuously removing said polymer-rich fraction from said zone and separating polymer therefrom, continuously removing said unpolymerized material from said zone; admixing said unpolymerized material with additional conjugated diolefin and monomer to form an aqueous emulsion; and introducing said emulsion into said centrifuging zone.

2. A process according to claim 1 wherein the conjugated diolefin is butadiene and the monomer is styrene.

I. LOUIS WOLK.

REFERENCES CITED

The following references are of record in the file of this patent:

UNITED STATES PATENTS

| Number | Name | Date |
|---|---|---|
| 2,234,204 | Starkweather | Mar. 11, 1941 |
| 2,363,951 | Fikentscher | Nov. 28, 1944 |